United States Patent [19]

Richard

[11] Patent Number: 4,610,704

[45] Date of Patent: Sep. 9, 1986

[54] DOWNFLOW DUST FILTER

[76] Inventor: Kenneth L. Richard, 514 Echo Valley Rd., Knoxville, Tenn.

[21] Appl. No.: 798,115

[22] Filed: Nov. 14, 1985

[51] Int. Cl.[4] .......................... B01D 27/00; B01D 46/04
[52] U.S. Cl. ................................ 55/302; 55/341 R
[58] Field of Search .............. 55/303, 96, 302, 341 R; 210/333.01, 333.1

[56] References Cited

U.S. PATENT DOCUMENTS

| | | | |
|---|---|---|---|
| 3,726,066 | 4/1973 | Colley et al. | 55/302 |
| 4,235,610 | 11/1980 | Richard | 55/302 |
| 4,445,914 | 5/1984 | Richard | 55/303 |

FOREIGN PATENT DOCUMENTS

| | | | |
|---|---|---|---|
| 2943093 | 5/1981 | Fed. Rep. of Germany | 55/302 |
| 1011189 | 4/1983 | U.S.S.R. | 55/302 |

*Primary Examiner*—Bernard Nozick
*Attorney, Agent, or Firm*—Solon B. Kemon

[57] ABSTRACT

An improved industrial filter apparatus for separating particulate material from air and/or other gases is disclosed. A plurality of individual filter elements are enclosed in a housing which admits particulate laden gases to enter the top of the housing and flow downwardly, radially inwardly of the individual filter units so that particulates accumulate on the exterior of the filters. The interior of a plurality of filters communicate with a common clean air duct functioning as a plenum which is closed at one end and open at its opposite end to a clean air outlet fitting in the side wall of the housing. Also within the clean air duct are a plurality of venturis communicating with the duct and the interior of each filter. A compressed air source is arranged to fire pulses of air upwardly through the venturis to remove the particulates from the exterior filter surface. The generally downward flow of dirty air assists in conveying the particles removed from the filters to the bottom of the housing where they are periodically removed through a conventional valving arrangement.

3 Claims, 3 Drawing Figures

DOWNFLOW DUST FILTER

BACKGROUND OF THE INVENTION

The present invention relates to industrial filter system generally of the type shown in my prior U.S. Pat. Nos. 4,235,610 and 4,445,914. The present invention represents an improvement over the apparatus shown in my prior patents and any others known to me in that the path of flow of gases to be cleaned of particulate matter is generally from the top toward the bottom of the housing rather than in the opposite direction. Since removal of the particulate matter from the housing takes place at the bottom of the housing as in the prior patents, the movement of particulates from the exterior of the filters to the lower portion of the housing is facilitated during cleaning cycles by the generally downward air flow rather than being in opposition to such flow.

DETAILED DESCRIPTION

Figure 1:
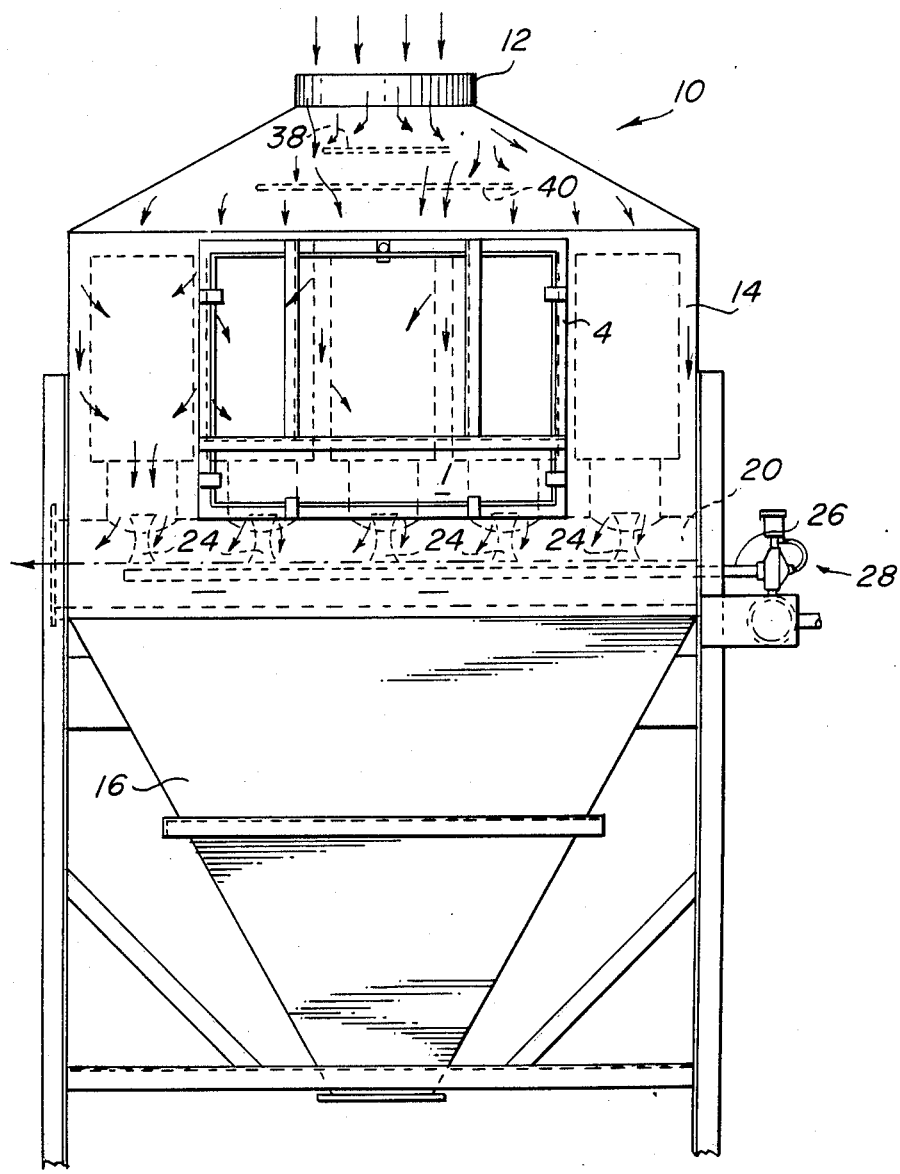
FIG. 1 is a side elevation partially in section of a filter apparatus in accordance with the present invention.

Referring now to the drawing, the apparatus includes a housing 10 having an inlet opening 12 at the top thereof for the admission of particulate laden gases. An intermediate section of the housing 14 provides a dirty gas chamber and the lower portion of the housing 16 tapers downwardly to a clean-out or dust discharge opening.

Figure 2:
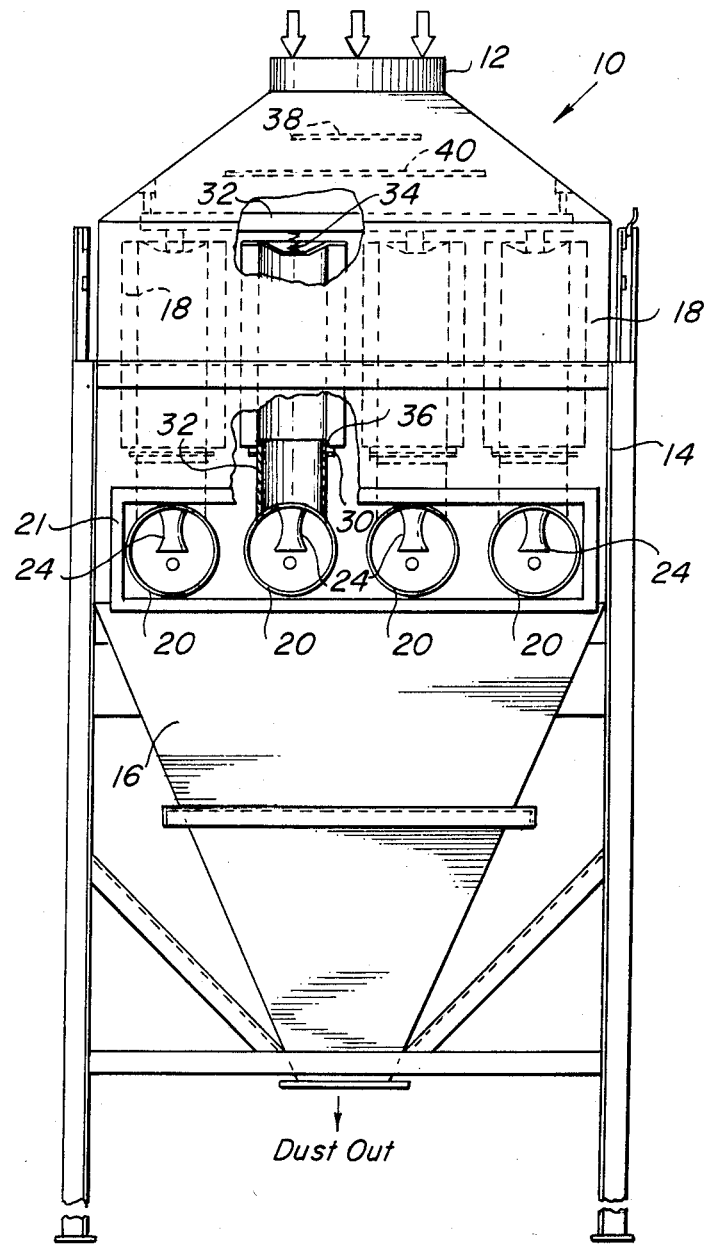
FIG. 2 is a view similar to FIG. 1 but taken at 90° thereto.

As shown in FIG. 2, the intermediate section of the housing encloses a plurality of rows of individual filter elements 18. In the FIG. 2 embodiment, the filter elements 18 are shown as rigid cartridge type filters closed at their upper ends and open at their bottom ends. A plurality of duct members 20 parallel to each other extend across the interior of the housing 10. As shown in FIG. 1, these ducts are closed at the right hand end as shown in this figure and open at their left hand end to a flanged clean air outlet 21 in the side wall of the filter housing. Groups of the filter elements 18 communicate with the interor of these ducts through vertically extending short duct sections 22.

From the structure thus far described, it will be apparent that the particulate laden gases flowing downwardly through the inlet 12 surround the filter elements and flow radially inwardly through each, leaving the lighter particulates entrained on the outer surface of each filter. While heavier particles will continue on to the lower portion of the housing, the thus cleaned gases exit from the center portion of the filter elements into the vertical duct sections 22 and into the horizontal ducts 20 which conduct them toward the outlet opening 21 in the side wall of the housing.

Reverse flow cleaning of the individual filter elements is provided. A plurality of venturis 24, one for each filter element are positioned within the horizontal clean air ducts as shown in FIG. 2 and extend through the upper wall thereof into the vertical duct sections. A compressed air line 26 also extends through the horizontal ducts immediately below the lower end of the venturis and lines 26 have a common connection to a source of compressed air. Valve means 28, one for each air line 26 permits the pulsed firing of jets of air into selected columns of the venturis so as to clean a group of filters while the others remain on line. Since the general flow of air through the housing is from top to bottom, this aids in the movement of the particulates removed from the filter during a cleaning cycle towards the clear out or dust discharge opening in the bottom of the housing.

As shown in FIG. 2, the cartridge filters are conveniently supported in the housing between a flange 30 surrounding the upper end of the vertical ducts 22 and a cross bar 32 extending across the housing. Insertion of and removal of filters from the housing is easily accomplished because the springs 34 simply resiliently bias the filter structures against an annular sealing member 36 which overlies the flange 30.

Any appropriate diffusing means indicated at 38 and 40 may be employed between the inlet 10 and the upper end of the filter bank in order to achieve uniform flow over the various individual filter elements.

Figure 3:
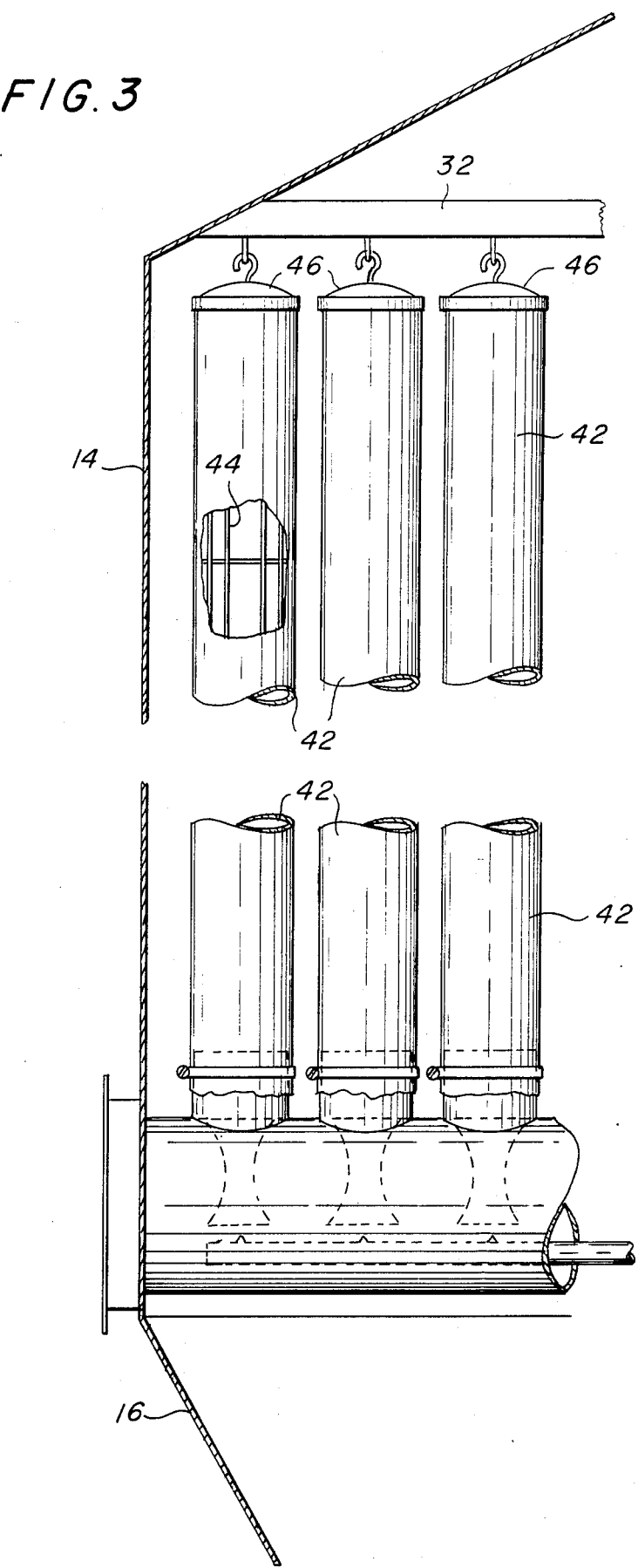
FIG. 3 is a partial sectional view of a modification of the apparatus shown in FIGS. 1 and 2.

Turning now to FIG. 3, this is a partial illustration of an embodiment in which flexible filter bags 42 are employed in place of the cartridge filters 18 of FIGS. 1 and 2. Preferably, each filter bag surrounds a rigid open work cage member 44. The lower ends of the filter bags merely encircle the vertical duct sections and may be releasably clamped thereto in any convenient manner. The filter bags may be hung from the overhead cross bar 32 from a cap structure which closes the upper ends of the bags.

In operation of either embodiment, the particulate laden gases enter the housing 10 through the inlet 12 and are diffused to achieve laminar flow downwardly around the exterior of the multiple filters. The flow through the filters themselves is radially inwardly and then downwardly through the open bottom into the clean air ducts 20 to the outlet in the side wall of the casing. One or more rows of the filter elements may be cleaned by reverse jet pulse cleaning action while the other filters remain on line.

Another advantage of the inverted filter arrangement is that moisture which may condense out of the cleaning air jets on the perforated metallic tubes which form the inner support for the cartridge filter elements will readily drain out of the filters to the bottom of the duct sections 22 for removal by evaporation into the filtered air stream, rather than to be carried onto the filter material While preferred embodiments of the invention have been herein shown and described, applicant claims the benefit of a full range of equivalents within the scope of the appended claims

I claim:

1. Industrial dust filter apparatus comprising:
    a housing including upper, intermediate and lower sections, said upper section having a top opening inlet for particulate laden gases and said lower section tapering downwardly to a particulate outlet;
    a plurality of vertically arranged substantially cylindrical filters supported in substantially parallel relationship to each other in said intermediate section of said housing, said filters being closed at their upper ends and having their exterior filter surfaces exposed to particulate laden gases from said inlet;
    at least one horizontal duct extending across said housing beneath said filters, closed at one end and opening at its other end to a clean gas outlet through a side wall of said intermediate housing section;

means communicating the lower open end of said filters through the upper walls of said duct so that said duct functions as a clean gas plenum;

a plurality of verturis, vertically supported in said duct, one aligned with each filter; and means in said duct for pulse firing a jet of air upwardly through said venturis into the interior of said filters to remove particulates from the outer surfaces thereof.

2. Apparatus as defined by claim 1 in which said filters are rigid cartridge type filters.

3. Apparatus as defined by claim 1 in which said filters are flexible bag type filters each surrounding a rigid open cage.

* * * * *